United States Patent
Shasa

(10) Patent No.: US 7,774,023 B2
(45) Date of Patent: Aug. 10, 2010

(54) SYSTEM AND METHOD FOR ASSOCIATING DEVICE INFORMATION WITH DIGITAL IMAGES

(75) Inventor: Shaheen Shasa, Bangalore (IN)

(73) Assignee: Kyocera Corporation, Kyoto (JP)

( * ) Notice: Subject to any disclaimer, the term of this patent is extended or adjusted under 35 U.S.C. 154(b) by 338 days.

(21) Appl. No.: 11/691,378

(22) Filed: Mar. 26, 2007

(65) Prior Publication Data

US 2008/0239096 A1 Oct. 2, 2008

(51) Int. Cl.
*H04M 1/00* (2006.01)

(52) U.S. Cl. .............. 455/556.1; 348/231.6; 713/165; 713/175; 713/176

(58) Field of Classification Search .............. 455/556.1, 455/410, 411, 412.1; 348/231.99, 231.2, 348/231.3, 231.6; 713/165, 175, 176
See application file for complete search history.

(56) References Cited

U.S. PATENT DOCUMENTS

| | | | | |
|---|---|---|---|---|
| 5,862,218 | A * | 1/1999 | Steinberg | 713/176 |
| 6,425,081 | B1 * | 7/2002 | Iwamura | 713/176 |
| 6,795,566 | B2 | 9/2004 | Acharya et al. | 382/100 |
| 7,450,163 | B2 * | 11/2008 | Rothschild | 348/231.2 |
| 7,456,872 | B2 * | 11/2008 | Rothschild | 348/231.99 |
| 7,620,257 | B2 * | 11/2009 | Tanaka et al. | 382/240 |
| 7,663,670 | B1 * | 2/2010 | Orboubadian | 348/231.2 |
| 2002/0186887 | A1 | 12/2002 | Rhoads | |
| 2004/0109063 | A1 | 6/2004 | Kusaka et al. | |
| 2005/0073725 | A1 * | 4/2005 | Lim | 358/3.28 |
| 2005/0169499 | A1 | 8/2005 | Rodriguez et al. | |
| 2005/0280720 | A1 * | 12/2005 | Kwon et al. | 348/231.3 |
| 2007/0273774 | A1 * | 11/2007 | Holmes | 348/231.2 |
| 2008/0199040 | A1 * | 8/2008 | Jonsson et al. | 382/100 |

FOREIGN PATENT DOCUMENTS

| | | |
|---|---|---|
| JP | 2004 159219 | 6/2004 |
| JP | 2004 242096 | 8/2004 |
| JP | 2004 357145 | 12/2004 |
| JP | 2005 027135 | 1/2005 |

OTHER PUBLICATIONS

Internet Document: "JPSEC Committee Draft—Version 1.0" available at http://www.itscj.ipsj.or.jp/sc29/open/29view/29n6006t.pdf (accessed Mar. 21, 2007).

* cited by examiner

*Primary Examiner*—Olisa Anwah

(57) ABSTRACT

A source electronic device, system and method that is configured to associate a digital image with the source electronic device that generated the digital image is described. The source electronic device comprises a camera, a source identification module, a processor and a memory module. The camera captures at least one unprocessed image. The source identification module identifies the source electronic device with one or more source identification information. The processor processes the captured unprocessed image, and generates a processed digital image. The processed digital image comprises an image header having the source identification information. The memory module stores the processed digital images having the source identification information in the image header. The system comprises a network server and the source electronic device, which further comprises an encryption module configured to encrypt the source identification information. The network server communicates with the source electronic device and assists in decrypting the image header having the encrypted source identification information.

18 Claims, 5 Drawing Sheets

| Mobile Directory Number (MDN) | Cellular Telephony System |
| --- | --- |
| Media Access Control (MAC) ID | Carrier |
| User Name | Time and Date |
| User Password | E911 Location |

SYSTEM AND METHOD FOR ASSOCIATING DEVICE INFORMATION WITH DIGITAL IMAGES

FIELD OF THE INVENTION

This invention generally relates digital image capturing devices, and more particularly to a system and method for associating source device information with digital images.

BACKGROUND

An image or video that an individual may consider intrusive or a violation of individual privacy can be easily uploaded to the World Wide Web and be distributed worldwide within minutes or seconds from the time the picture or video was taken. Due to the anonymity of person posting the image or video, it is difficult to identify the person or electronic device that took the intrusive image. Since there is no way to track the person taking the image or video, there is no simple way to hold the person that took the intrusive image accountable.

There are a variety of different techniques for uploading intrusive images or videos on to the Internet. One technique uses "camera phones," in which cameras are placed on a wireless handset that capture and images and/or video. These camera phones are wireless handsets that operate on a network that freely permits uploading images or videos. The number and type of images collected are typically limited by the amount of available storage or memory on the wireless handset. These wireless handsets include, but are not limited to, cellular phones, WI-FI enabled phones, WiMAX phones, and other such wireless phones that operate using a network system, and which can be communicatively coupled to the Internet.

Another technique for uploading intrusive images or videos is to capture still images or video using a digital cameras or digital video recorders, respectively. Either the camera or video recorder is operatively coupled to a personal computer (PC). The images or video are then uploaded from the electronic device to the PC. If the PC has a broadband connection to the Internet, the images or videos can be easily uploaded to one or more popular websites.

One of the suggested solutions to overcome the privacy concerns associated with camera-enabled mobile phones is to have all camera-enabled phones flash or make a loud sound when they are being used to take a photograph. Regretfully, this solution puts a substantial constraint on the person taking the picture or video, when the use is legitimate.

Another solution leverages the Joint Photographic Experts Group (JPEG) 2000 standard, which includes a JPEG 2000 Security (JPSEC) section. Applications addressed by JPSEC include encryption of the image and the verification of the authenticity of the source. However, it appears that JPSEC is intended to protect content and is not intended to prevent intrusive images that violate individual privacy concerns.

Accordingly, there remains a strong need in the art for a system and method that would prevent the uploading of intrusive images or videos, taken by portable devices, such as camera-enabled mobile phones, and thereby minimize privacy violations without placing a substantial constraint on a person taking a legitimate image.

SUMMARY

A source electronic device that is associated with a digital image that is generated by the source electronic device is described. The source electronic device comprises a camera, a source identification module, a processor and a memory module. The camera captures at least one unprocessed image. The source identification module identifies the source electronic device with one or more source identification information. The processor processes the captured unprocessed image, and generates a processed digital image. The processed digital image comprises an image header having the source identification information. The memory module stores the processed digital images having the source identification information in the image header.

A system that is associated with the digital image generated by the source electronic device is also described. The system comprises a source electronic device and a network server. The source electronic device comprises a camera and source identification module as described above. The source electronic device also comprises an encryption module configured to encrypt the source identification information. The processor generates a processed image that comprises an image header having the source identification information. The network server communicates with the source electronic device and assists in decrypting the image header having the source identification information.

A method that associates the digital image with the source electronic device is also described. The method comprises providing the source electronic device with a camera component that is configured to capture at least one unprocessed image. The method also comprises identifying the source electronic device with one or more source identification information. A processed image is then generated that comprises an image header having the source identification information. The processed digital image is then stored, and the stored digital image includes the source identification information in the image header.

BRIEF DESCRIPTION OF THE DRAWINGS

The present invention will be more fully understood by reference to the following drawings which are for illustrative, not limiting, purposes.

DETAILED DESCRIPTION

Figure 1:
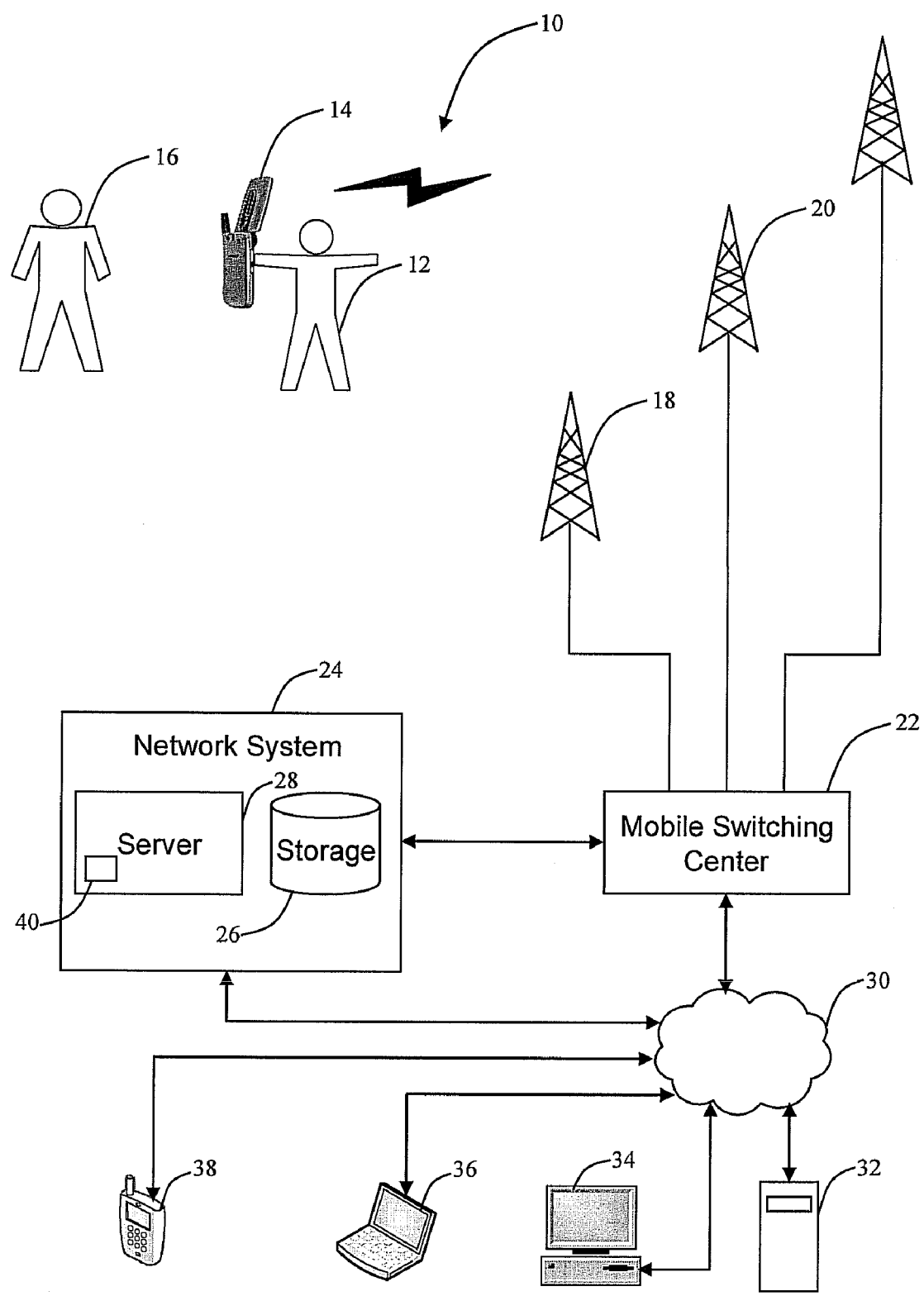
FIG. 1 shows a block diagram of a system that associates a source electronic device with a digital image according to one embodiment.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the methods may vary as to details, order of the actions, or other variations without departing from the illustrative method disclosed herein.

The device, system and methods described herein prevent or otherwise deter the uploading of intrusive images or intrusive audiovisual recordings captured by a source electronic device. The source electronic device information is used to assist in identifying the individual that captured the intrusive image or audiovisual recording. By enabling authorities to the track the offender, some level of prevention and/or deterrence is accomplished. Thus, the individual that captures the intrusive image or audiovisual recording is no longer "anonymous" because source identification information can be gathered and then be used to help identify the individual. Intrusive images may also include images or audiovisual recordings that are proprietary or confidential.

In general, the digital picture and digital video formats comprise a plurality of fields and bytes which are reserved and unused and that are ignored by the image decoding software when generating an image. These reserved and unused fields and bytes that are part of digital image format are referred to as an "image header." Those skilled in the art shall appreciate that the term "image header" refers to a one or more fixed fields containing information that is specific to the image file format, and although the term "header" may be construed to relate to the top or head of the image data file, the term "image header" has a much broader meaning and is not limited by the location of the fields and bytes which are reserved and unused.

For purposes of the present description, the term "image" is used broadly to encompass a single picture, a plurality of images, and audiovisual recordings or "video" that comprise a plurality of images that are capture using a digital camera, a digital video recording system, or any combination thereof.

In operation, the image header can be used to encode information into the image that can be used to help identify the person capturing the intrusive image. For example, in the illustrative embodiment of a camera-enabled mobile phone, the subscriber of the camera-enabled mobile phone can be identified if the mobile directory number (MDN) is encoded in the image header. When the intrusive image enters the public domain and a person has established a grievance, the MDN information encoded in the image header can be used to assist in finding the person or camera-enabled mobile phone that was used to capture the intrusive image. Thus, while this illustrative embodiment may not deter a person from taking an intrusive image, it may prevent the sharing of image.

Although, the illustrative embodiment refers to a camera-enabled mobile phone, the systems, apparatus, and methods described herein may be applied to other source electronic device that is camera enabled. The source electronic device may be a digital camera, video camera, camcorder, web camera, a camera enabled wireless handset, or any other such devices configured to capture at least one image.

Referring to FIG. 1 there is shown a block diagram of a system that associates a source electronic device with a digital image. The system 10 associates one or more digital images taken by a person 12 with the source electronic device. The illustrative source electronic device is a wireless handset 14. The wireless handset 14 may be a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. The wireless communications systems include, by way of example and not of limitation, CDMA, GSM or UMTS or any other wireless communication system such as wireless local area network (WLAN) or WiMAX. It shall be appreciated by those of ordinary skill in the art that the term wireless handset, mobile handset, wireless phone, and mobile phone are interchangeable. Additionally, it shall be appreciated by those of ordinary skill in the art that the source electronic device may be any device that is capable of capturing an image or making an audiovisual recording.

In the illustrative embodiment, the illustrative source electronic device 14 is used to capture an image of another person 16, and comprises a camera, a source identification module, and an encryption module. Additionally, the illustrative wireless handset 14 comprises a processor that generates a processed image having an image header that contains source identification information. By way of example and not of limitation, the source identification information is selected from a group consisting of a mobile directory number (MDN), MAC ID, a user ID, a password, a date, a time, a user name, a phone number, or any other such means for identifying the source electronic device. Additionally source identification information may be provided by the network, so that source identification information may also include the cellular telephony system, carrier, time, date, and Enhanced 911 location information.

In the illustrative embodiment, the source electronic device 14 is configured to encrypt the source identification information and embed the source identification information in the image header of the processed digital image. Also, the source electronic device 14 comprises a display that is configured to show the processed digital image. However, if the source identification information in the image header has been compromised, e.g., modified or deleted, then the processed digital image is not viewable on the source electronic device 14, as described more fully below.

The illustrative wireless handset is configured to communicate wirelessly with base stations 18 and 20, which are operatively coupled to mobile switching center 22. The mobile switching center 22 is configured to communicate with network system 24 having a storage component 26 and a server 28.

In the illustrative embodiment, the network system 24 is regularly or periodically instructing the wireless handset 14 to remotely perform network adjustments that change the software programs running on the illustrative wireless handset. Thus, the wireless handset 14 may be programmed remotely to perform specific operations such as associating the source electronic device with the image, encrypting the source electronic device information, and placing the source identification information in the image header associated with the processed image.

The mobile switching center 22 is also configured to communicate with a Wide Area Network (WAN) 30 represented by the network cloud. By way of example and not of limitation, the WAN 30 is the Internet. The WAN 30 is used to communicate the processed digital image to a plurality of remote electronic devices. The electronic devices include, but are not limited to, servers 32, desktop computers 34, laptop computers 36 and mobile devices 38, which are configured to view the images captured by the source electronic device 14.

Decryption keys are stored on the network system 24. The decryption keys permit a third party, e.g. law enforcement, to access the encrypted source identification information in the image header. In one illustrative embodiment, the network system 24 is configured to prompt a third party to provide a user name and password to access the network, which permits the validated user to access one or more decryption keys associated with a particular image. The password is authenticated by a password authentication module 40.

Figure 2:
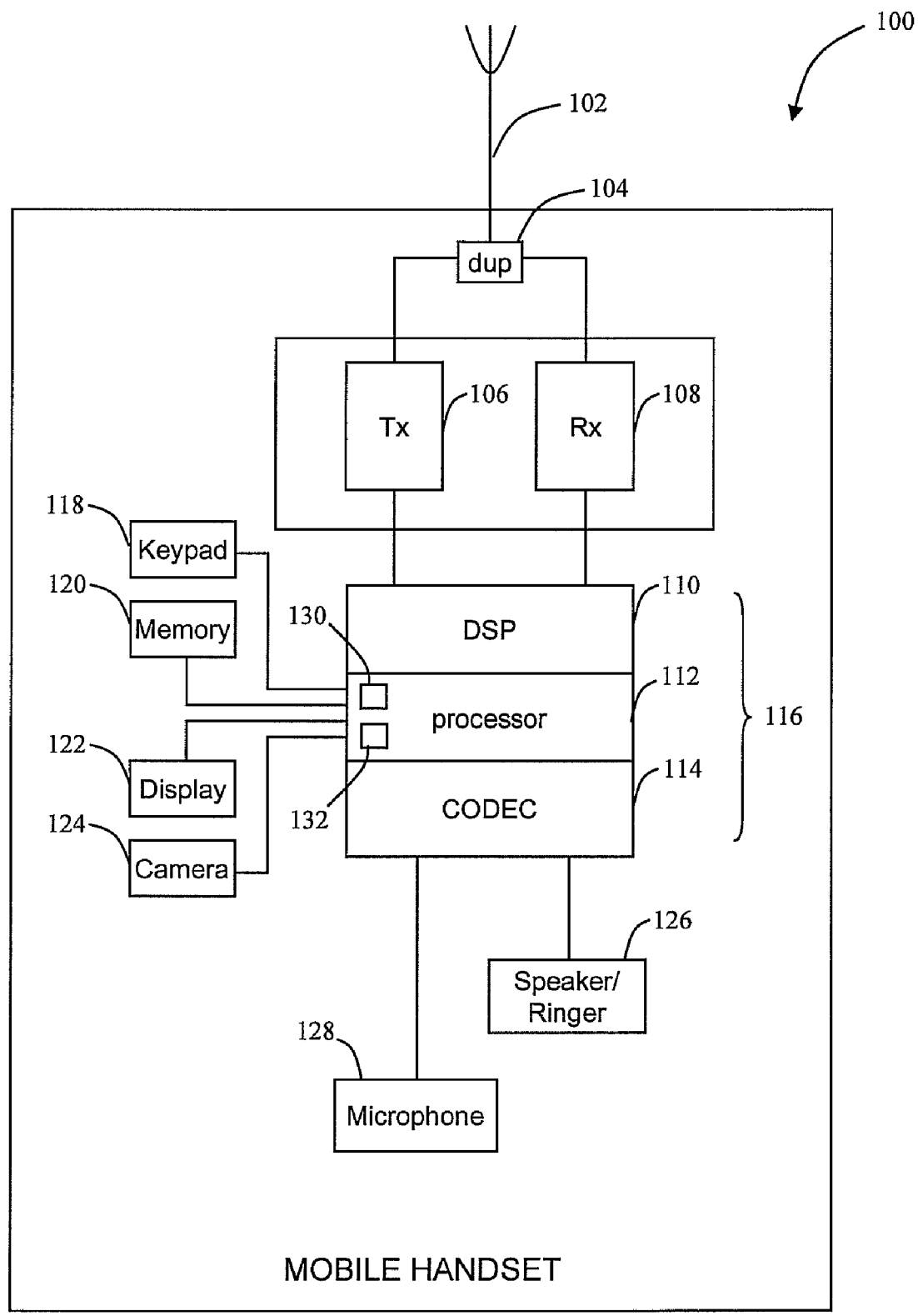
FIG. 2 shows a source electronic device that is associated with a digital image according to one embodiment.

Referring to FIG. 2 there is shown a block diagram of an illustrative source electronic device that is configured to associate source identification information with a particular digital image. The illustrative source electronic device is a wireless handset 100 that is configured to operate within the illustrative system 10 as the source electronic device 14 shown in FIG. 1.

The illustrative wireless handset 100 comprises a first antenna element 102 that is operatively coupled to a duplexer 104, which is operatively coupled to transmitter 106 and receiver 108. An illustrative control module 116 comprises a digital signal processor (DSP) 110, a processor 112, and a CODEC 114 that are communicatively coupled to the transmitter 106 and receiver 108. The DSP 110 may be configured to perform a variety of operations such as controlling the antenna 102, transmitter 106, and receiver 108 operations. The processor 112 is operatively coupled to a keypad 118, a memory 120, a display 122, and a camera 124. The processor 112 is also operatively coupled to the CODEC module 114 that performs the encoding and decoding operations and is communicative coupled to a speaker or ringer 126, and a microphone 128.

The illustrative mobile handset 100 may be built as a light weight and small device adapted to be portable and may be conveniently carried around by a user. The mobile handset 100 is further adapted for caller operation and is enabled to permit a user to manually input data with the keypad 116 that may be a normal key pad, such as key pad for a cell phone or a PDA, and may additionally include specific input keys, such as a scrolling means or the like, to input particular information or to perform particular selection functions. Input data or requests may be taken from voice information that are received from microphone 124 or a combination of voice information and DTMF signals. The memory module 120 may be used for storing input data or storing programming information that is pre-loaded on the mobile handset 100, or that has been downloaded to the mobile handset 100.

In addition to the camera 124, the processor 112, and the memory module 120, the source electronic device 100 comprises a source identification module 130. The source identification module 130 identifies the source electronic device with one or more source identification information. By way of example and not of limitation, the source identification information may include information such as MDN, MAC ID, a user ID, a password, a date, a time, a user name, or other such source identification information.

The encryption module 132 performs either encryption operations, data corruption operations, or both. In cryptography, a cipher is an algorithm that is used for performing encryption and decryption. The encryption and decryption process is performed using keys which can be divided into symmetric key algorithms and asymmetric key algorithms. To ensure that data has not been corrupted during transmission or encryption, a checksum algorithm can be used to make to make sure that data has not been compromised in some fashion. Additionally, a cyclic redundancy check (CRC) maybe performed.

The corruption operations, such as checksum and CRC, effectively prevent random information from being inserted into the image header. Therefore, an individual that understands the imaging format or standard is prevented from replacing reserved bytes with random information without affecting the picture decoding operation.

In operation, the camera 124 captures at least one unprocessed image. The unprocessed image may be captured using a single-shot method, multi-shot method, or scanning method that uses image sensors such as a charge-coupled device (CCD) or a complimentary metal-oxide conductor (CMOS) sensor. Depending on the camera, firmware or software interprets the raw unprocessed image data. The firmware is a computer program that operates on top of the processor 112.

The processor 112 then processes the captured unprocessed image and generates a processed digital image, which comprises an image header having the source identification information. In one illustrative embodiment, the illustrative checksum operation is performed by encryption module 132 of the processor 112. If the processor 112 detects data corruption, the format and image file is rendered invalid. In this embodiment, software applications or "viewers" that are capable of reading the corrupted file format would be required to perform the checksum operation. If the checksum is incorrect, the illustrative viewer would not be able to view the corrupted image file or otherwise prevent the viewing of the corrupted image file.

In another illustrative embodiment, if the checksum operation reflects data corruption, the image file may be corrupted by processor 112 by scrambling the data in the image file, thereby making the image file unreadable to a custom viewer designed to view the corrupted image file. This level of image file corruption may require that the checksum operation be performed during a file transfer process such as the transferring between nodes, e.g. a wireless handset to a PC.

By way of example and not of limitation, the JPEG 2000 standards may be configured to require performing the illustrative checksum operation before the viewer opens the image file, or configured to corrupt the image file when the image is transferred from one node to another. Further still, the source identification information may be configured to comply with JPEG 2000 standards and source authentication component of the JPSEC section, which addresses security concerns. Those skilled in the art shall appreciate that the insertion of source identification information in the image header may be integrated into the JPEG 2000 standard or other such standard.

In the illustrative embodiment, the processor 112 may also be configured to encrypt the source identification information and embed the encrypted source identification information in the processed digital image. The decryption keys may be stored on the network as described above and below.

This display 122 is configured to show the processed digital image. The processed digital image is not viewable on the display 122 if the source identification information in the image header has been compromised.

The memory module 120 stores the processed digital images having the source identification information in the image header. The processed digital image is configured to be communicated using a Wide Area Network (WAN) such as the Internet. The processed image is formatted so that is may be viewed by another electronic device that is communicatively coupled to the WAN.

Figure 3:
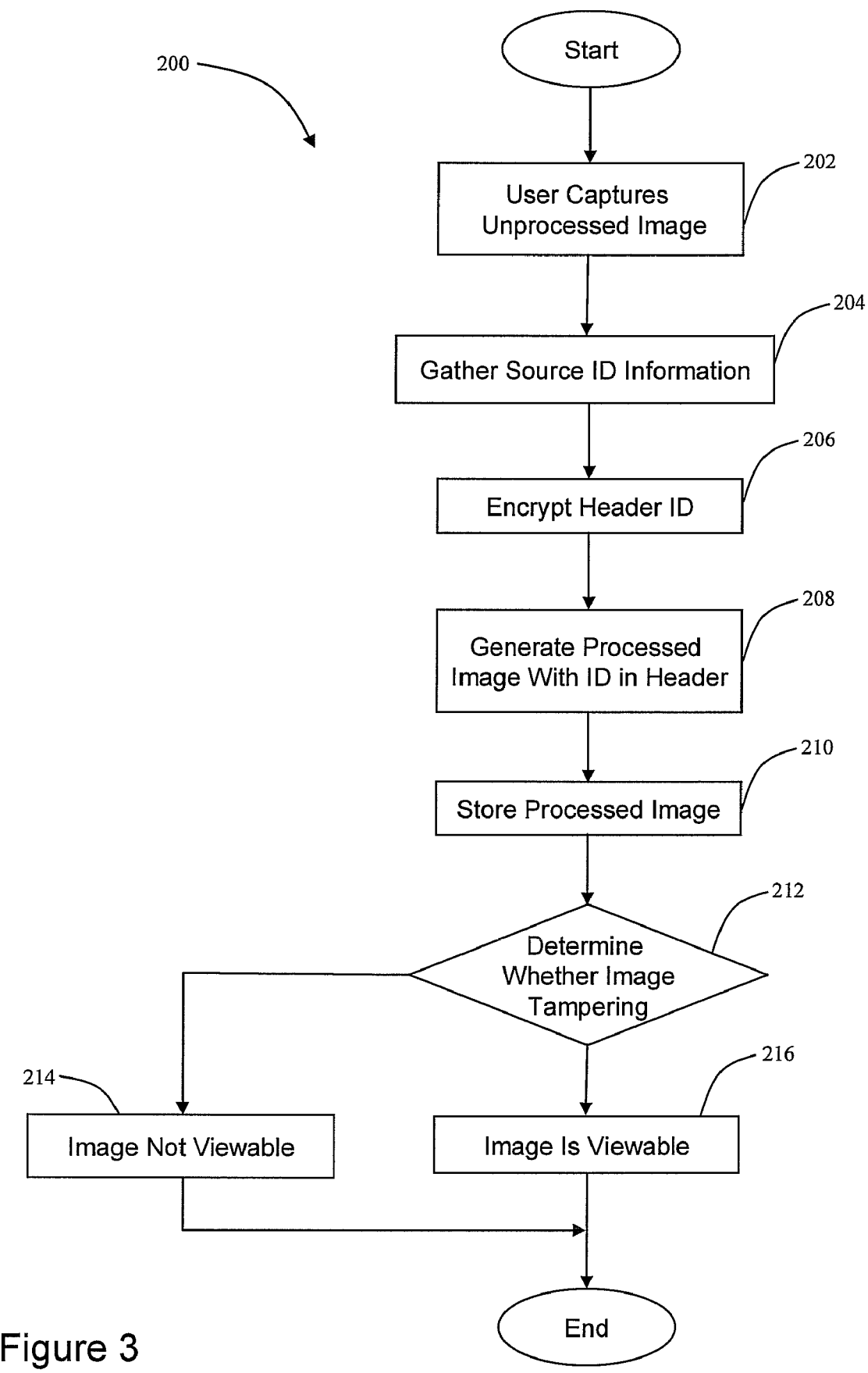
FIG. 3 shows an illustrative flowchart of a method for associating the digital image with the source electronic device according to one embodiment.

Referring to FIG. 3 there is shown an illustrative flowchart of a method for associating the digital image with the source electronic device. The method 200 is described in relation to the illustrative source electronic device 100 described above in FIG. 2.

The method is initiated at block 202 where the user of the source electronic device 100 captures at least one unprocessed image with the camera 124 component. At block 204, the source identification information for the source electronic device 100 is gathered with the source identification module 130 described above. By way of example and not of limitation, the source identification information may be a mobile device number, a MAC ID, a user ID, a password, a date, a time, a user name, or any combination thereof.

At block 206, the source identification information may be encrypted in the image header. The encryption module 132 is configured to encrypt the source identification information before the source identification information is inserted into the image header. Additionally, at block 206, a checksum or CRC operation may be performed to ensure that the image has not been compromised.

At block 208, a processed image is generated. The processed image comprises an image header having the source identification information.

The method then proceeds to block 210 where the processed imaged is stored. The processed digital image comprises the source identification in the image header. By way of example and not of limitation, the processed image is stored in a local memory module 120.

At decision diamond 212, a determination of whether the processed image has been tampered with is made. The process of viewing the image may require an image viewer that performs a checksum or CRC operation. Generally, the processed image is not viewable if the image header has been corrupted. In one illustrative embodiment, a compromised image may not be opened because the image header has been tampered with.

If the determination is that tampering of the image header has occurred, then a person is prevented from viewing the image as represented by block 216. If there has been no tampering, the method proceeds to block 216, where the image is viewable.

Figures 4, 5A:
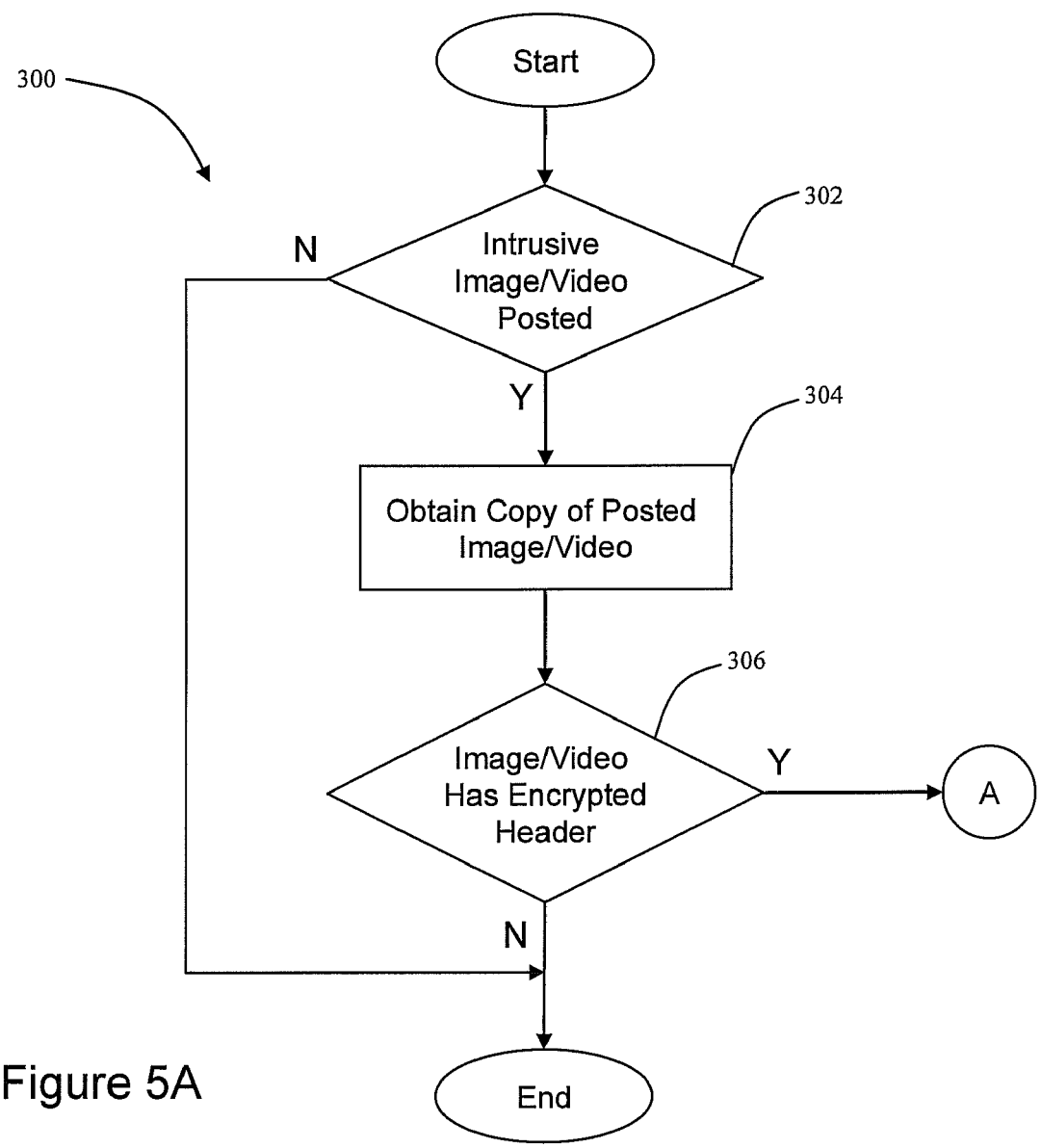
FIG. 4 shows an illustrative table of source identification information according to one embodiment.
FIGS. 5A and 5B show an illustrative flowchart of a method for accessing source identification information according to one embodiment.

Referring to FIG. 4 there is shown an illustrative table of source identification information 250. By way of example and not of limitation, the source identification information is selected from a group consisting of a mobile directory number (MDN), Media Access Control (MAC) ID, a user ID, a password, a date, a time, a user name, a phone number, or any other such means for identifying the source electronic device. Additionally source identification information may be provided by the network, so that source identification information may also include the cellular telephony system, carrier, time, date, Enhanced 911 location information, or any combination thereof. Further still, the source identification information may include information that the user can not access, e.g. AKEY information that is known by the Carrier but not the subscriber.

Referring to FIG. 5A there is shown an illustrative flowchart of a method for accessing the source identification information. The method is initiated at decision diamond 302 where a determination is made whether an intrusive image or audiovisual recording has been posted in a particular location. The inappropriate image may be communicated or viewed by another electronic device using a wide are network. For example, an image may be posted on the World Wide Web using the Internet. The image may be considered intrusive or inappropriate to an individual or entity. More particularly, the image may be considered personal, proprietary, confidential, offensive or any combination thereof.

Of course, if the image is not an intrusive image, then there is no need to decrypt the source identification information in the image header. However, if the image is deemed to be intrusive, the method proceeds to block 304 where a copy of the digital image is obtained.

At decision diamond 306, the determination is made whether the copy of the digital image has encrypted source identification in the image header. If the determination is made that there is no encrypted source identification information, then the method is terminated. Additionally, if the source identification information is not encrypted and readily obtained, then the process for determining the source identification information has been completed.

Figure 5B:
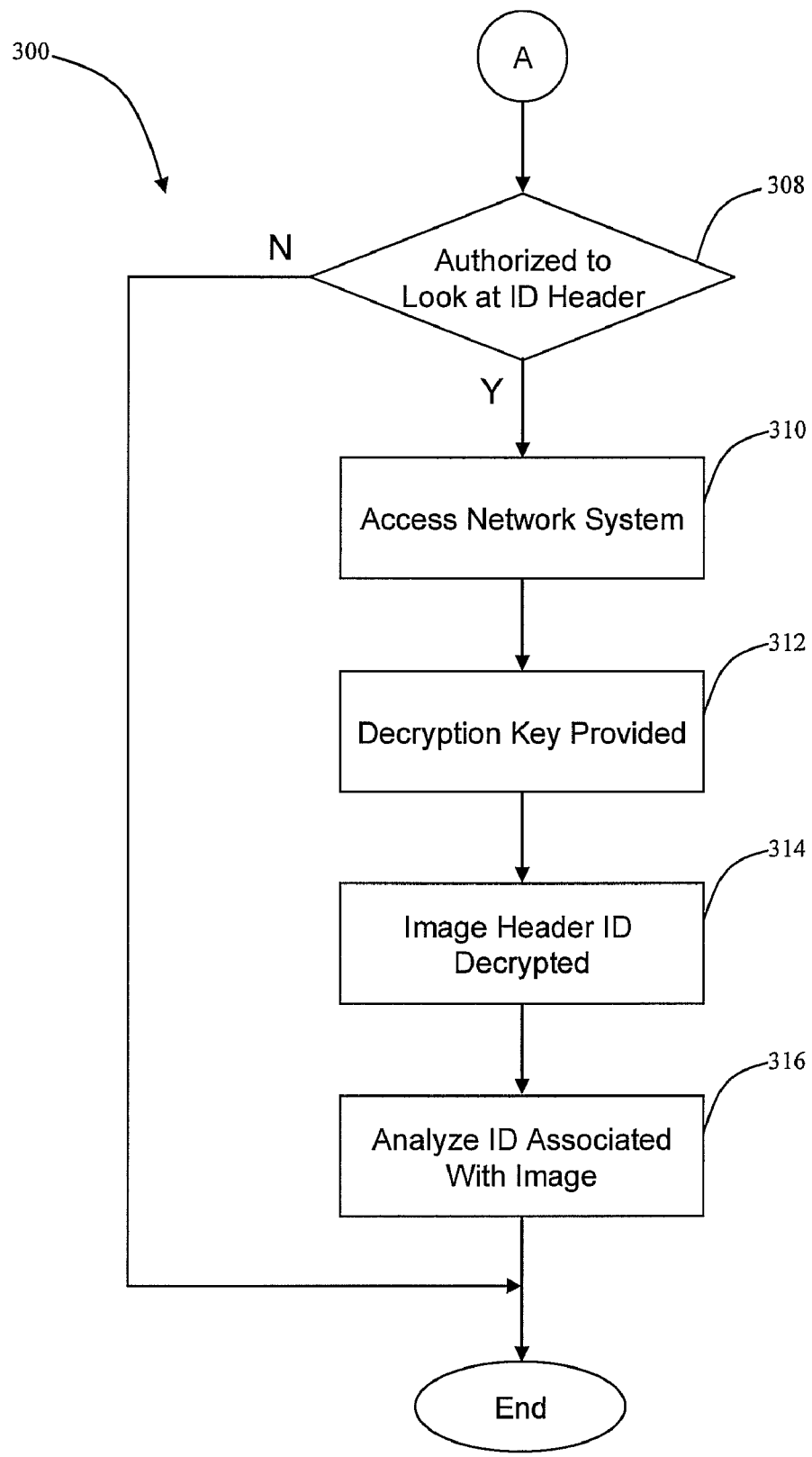

However, if a determination is made at decision diamond 306 that the copied image has encrypted source identification information in the image header, then the method 300 proceeds to FIG. 5B.

At decision diamond 308, the determination is made whether the person requesting the source identification information is authorized to view the source identification information. It is not expected that the source identification information for each image shall be easily available because this action may also be viewed as an intrusion into individual privacy. Thus, the individual or entity requesting the source identification information needs to be an authorized entity. For example, the authorized individual may be employed by a law enforcement entity, a legal entity, or other such entity that is authorized to access the encrypted source identification information in the copied image. Therefore, if the individual is not authorized to view the source identification information, then the individual can not access the network system 24 described above in FIG. 1.

However, if the individual is authorized to access the network system 24, the method proceeds to block 310. By way of example and not of limitation, the authorized individual may have to provide and user name and password to access the network system 24. After providing the appropriate authentication information, at least one authorized user is provides with user access to the at least one decryption key.

At block 312, the authorized individual is provided with one or more decryption keys that permit the authorized user to unlock the encrypted source identification information. The decryption key is configured to decrypt the encrypted source identification information in the image header. At block 314, the encrypted source identification information in the image header is decrypted. Finally, the authorized user can analyze the source identification information at block 316, and this analysis may result in determining who took the intrusive image.

The system, apparatus, and method described above prevent the uploading of intrusive images or videos and thereby minimize privacy violations. Additionally, the system, apparatus, and method described above provide a solution that would not put a substantial constraint on a person taking a legitimate image. Furthermore, the system, apparatus, and method described above provide a solution that is relatively simple to implement. Further still, illustrative embodiments of wireless handset are described that would to deter people from misusing their cameras.

It is to be understood that the detailed description of illustrative embodiments are provided for illustrative purposes. The scope of the claims is not limited to these specific embodiments or examples. For example, a wireless handset 100 is described, however this solution may be extended to any source electronic device configured to capture an image. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A source electronic device configured to capture a digital image, the source electronic device comprising:
   a camera configured to capture at least one unprocessed image;
   a processor;
   a source identification module configured to identify the source electronic device with a source identification information;

a processor configured to process the captured unprocessed image, the processor further configured to generate a processed digital image that comprises an image header including the source identification information;

an encryption module of the processor capable of performing a checksum operation to detect corruption of the processed digital image;

a memory module configured to store the at least one processed digital image having the source identification information in the image header;

wherein if the processed digital image is determined to have an incorrect checksum, the processor scrambles the data in the processed digital image to prevent display of the processed digital image; and wherein if the processed digital image is determined to be an intrusive image, the image header is analyzed to determine the source identification information.

2. The source electronic device of claim 1 wherein the processor is further configured to embed an encrypted source identification information in the processed digital image.

3. The source electronic device of claim 2 wherein the processed digital image is configured to be communicated using a Wide Area Network (WAN), and viewed by another electronic device communicatively coupled to the WAN.

4. The source electronic device of claim 3 wherein the source electronic device is a wireless handset.

5. The source electronic device of claim 3 further comprising a display configured to show the processed digital image.

6. The source electronic device of claim 5 wherein the processed digital image is not viewable on the display if the source identification information in the image header has been compromised.

7. The source electronic device of claim 3 wherein the source identification information comprises a phone number associated with the source electronic device.

8. A system that associates a digital image with a source electronic device, the system comprising:

a source electronic device having a camera configured to a capture at least one unprocessed image, the source electronic device comprising, a source identification module configured to identify the source electronic device with a source identification information;

an encryption module configured to encrypt the source identification information, the encryption module capable of performing a checksum operation to detect corruption of the processed digital image; and a processor configured to generate a processed image that comprises:

a checksum; and an image header having the source identification information;

a network server that is configured to communicate with the source electronic device, the network sever configured to assist in decrypting the image header having the encrypted source identification information;

wherein if the processed digital image is determined to have an incorrect checksum, the processor scrambles the data in the processed digital image to prevent display of the processed digital image; and wherein if the processed digital image is determined to be an intrusive image, the image header is analyzed to determine the source identification information.

9. The system of claim 8 further wherein the source identification information comprises a phone number associated with the source electronic device.

10. The system of claim 8 wherein the source electronic device is a wireless handset.

11. The system of claim 8 further comprising a Wide Area Network (WAN) that is configured to communicate the processed digital image generated by the source electronic device to a plurality of electronic devices that can view the process image.

12. The system of claim 11 wherein the processed digital image is not viewable on the plurality of electronic devices if the encrypted source identification information in the image header has been compromised.

13. The system of claim 8 wherein the network server provides access to at least one authorized user.

14. The system of claim 13 wherein the authorized user can decrypt the encrypted source identification information to determine the source electronic device that captured the processed image.

15. A method for associating a digital image with a source electronic device, the method comprising:

capturing at least one unprocessed image via a camera component of the source electronic device;

identifying the source electronic device with a source identification information;

performing a checksum operation;

generating a processed image that comprises an image header having the source identification information; and a checksum;

posting the at least one processed digital image having the source identification information in the image header;

determining whether the image header has been corrupted using a checksum operation;

scrambling the data in the processed digital image to prevent viewing the at least one image if the source identification information are compromised;

determining that the processed digital image is an intrusive image; and determining that the intrusive image has encrypted source identification information in the image header.

16. The method of claim 15 further comprising communicating the at least one image to another electronic device using a wide area network.

17. The method of claim 16 further comprising storing at least one decryption key that is configured to decrypt an encrypted source identification instruction in the image header.

18. The method of claim 17 further comprising permitting at least one authorized user access to the at least one decryption key.

* * * * *